(12) United States Patent
Al-Amin et al.

(10) Patent No.: US 6,244,622 B1
(45) Date of Patent: *Jun. 12, 2001

(54) INITIATOR FOR AIR BAG INFLATOR

(75) Inventors: Ahmad K. Al-Amin, Higley; Timothy A. Swann, Mesa; Jess A. Cuevas, Scottsdale; Bryan W. Shirk; Roy D. Van Wynsberghe, both of Mesa, all of AZ (US)

(73) Assignee: TRW Inc., Lyndhurst, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,727

(22) Filed: Jun. 16, 1998

(51) Int. Cl.[7] .................................................. B60R 21/26
(52) U.S. Cl. ........................ 280/737; 280/741; 137/68.13
(58) Field of Search .................................... 280/737, 736, 280/741, 742; 102/501, 530, 531, 202.14; 222/3, 5; 137/68.13, 68.19, 68.3

(56) References Cited

U.S. PATENT DOCUMENTS

| | | | |
|---|---|---|---|
| 5,226,561 | 7/1993 | Hamilton et al. | 222/5 |
| 5,230,531 | 7/1993 | Hamilton et al. | 280/737 |
| 5,242,194 | 9/1993 | Popek | 280/737 |
| 5,421,609 | 6/1995 | Moore et al. | 280/737 |
| 5,516,147 | 5/1996 | Clark et al. | 280/737 |
| 5,558,367 | 9/1996 | Cuevas | 280/737 |
| 5,584,505 | 12/1996 | O'Loughlin et al. | 280/737 |
| 5,622,381 | 4/1997 | Mossi et al. | 280/737 |
| 5,623,116 | 4/1997 | Hamilton et al. | 102/289 |
| 5,653,463 | 8/1997 | Jeong | 280/737 |
| 5,762,364 | * 6/1998 | Cuevas | 280/731 |
| 5,803,493 | * 9/1998 | Paxton et al. | 280/737 |
| 5,941,562 | * 8/1999 | Rink et al. | 280/737 |
| 6,010,153 | * 1/2000 | Halas et al. | 280/737 |

* cited by examiner

*Primary Examiner*—J. J. Swann
*Assistant Examiner*—David R. Dunn
(74) *Attorney, Agent, or Firm*—Tarolli, Sundheim, Covell, Tummino & Szabo L.L.P.

(57) ABSTRACT

An apparatus (10) for inflating an inflatable vehicle occupant protection device (12) comprises an inflator structure (14) defining a chamber (50) for containing a quantity of inflation fluid (52) under pressure. The inflator structure (14) has a rupturable wall portion (60) blocking fluid flow out of the chamber (50). An actuatable initiator (74) is connected with the inflator structure (14) for generating combustion products. The initiator (74) has a central axis (80). A spherical projectile (76) is supported adjacent to the initiator (74) and is movable away from the initiator under the force of the combustion products of the initiator into engagement with the wall portion (60) to rupture the wall portion (60). The apparatus (10) includes a focusing sleeve (78) for constraining the spherical projectile (76) to move in a predetermined direction from the initiator (74) to the wall portion (60). The focusing sleeve (78) has an axis (142) located on the axis (80) of the initiator (74).

15 Claims, 3 Drawing Sheets

INITIATOR FOR AIR BAG INFLATOR

BACKGROUND OF THE INVENTION

1. Technical Field

The present invention relates to an apparatus for inflating an inflatable vehicle occupant protection device, such as an air bag. In particular, the present invention relates to an air bag inflator having a burst disk which is opened by an initiator.

2. Description of the Prior Art

U.S. Pat. No. 5,622,381 describes an inflator for inflating an air bag. The inflator includes a squib having an outer body portion enclosing a pyrotechnic material. A projectile in the form of a cylindrical metal sleeve, closed at one end, is snapped onto the outer body portion of the squib. Upon actuation of the squib, the outer end portion of the squib ruptures. The projectile is propelled from the squib into engagement with a burst disk to rupture the burst disk.

SUMMARY OF THE INVENTION

The present invention is an apparatus for inflating an inflatable vehicle occupant protection device, comprising an inflator structure defining a chamber for containing a quantity of inflation fluid under pressure. The inflator structure has a rupturable wall portion blocking fluid flow out of the chamber. The apparatus includes an actuatable initiator connected with the inflator structure for when actuated generating combustion products. The initiator has a central axis. A spherical projectile is supported adjacent to the initiator and is movable away from the initiator under the force of the combustion products of the initiator into engagement with the wall portion to rupture the wall portion. The apparatus includes a focusing sleeve for constraining the spherical projectile to move in a predetermined direction from the initiator to the wall portion. The focusing sleeve has an axis located on the axis of the initiator.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
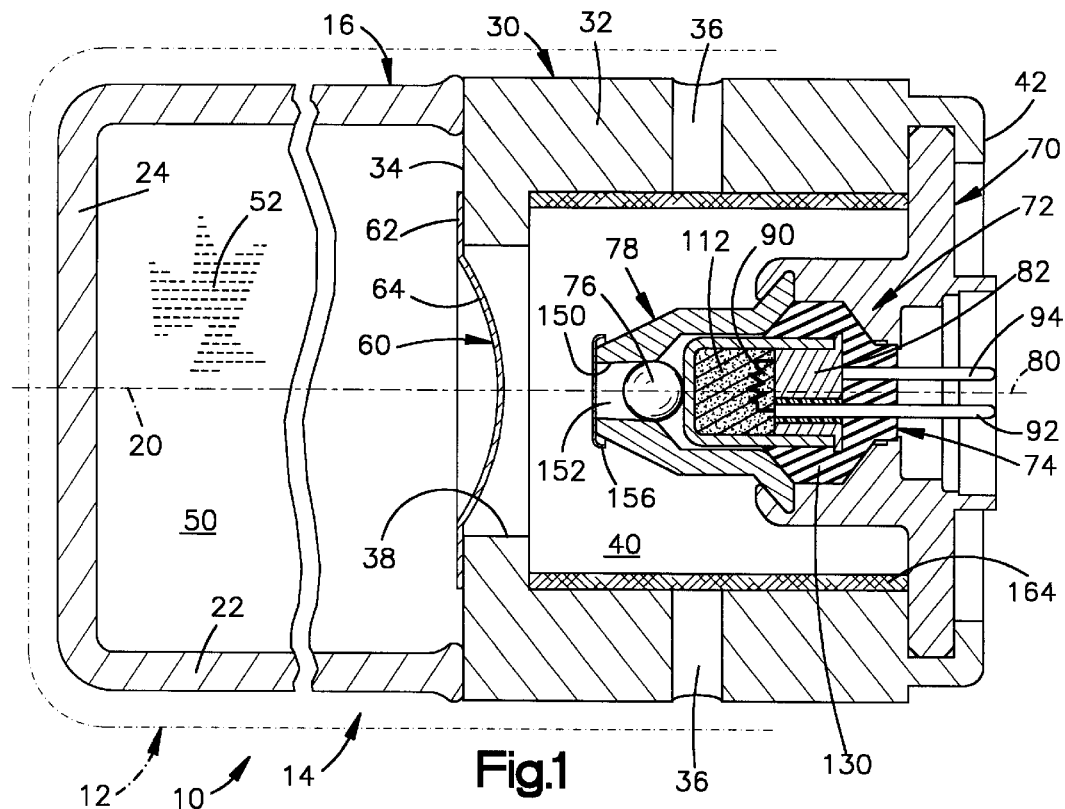
FIG. 1 is a longitudinal sectional view, partially broken away, of an inflator constructed in accordance with the present invention.
Figure 2:
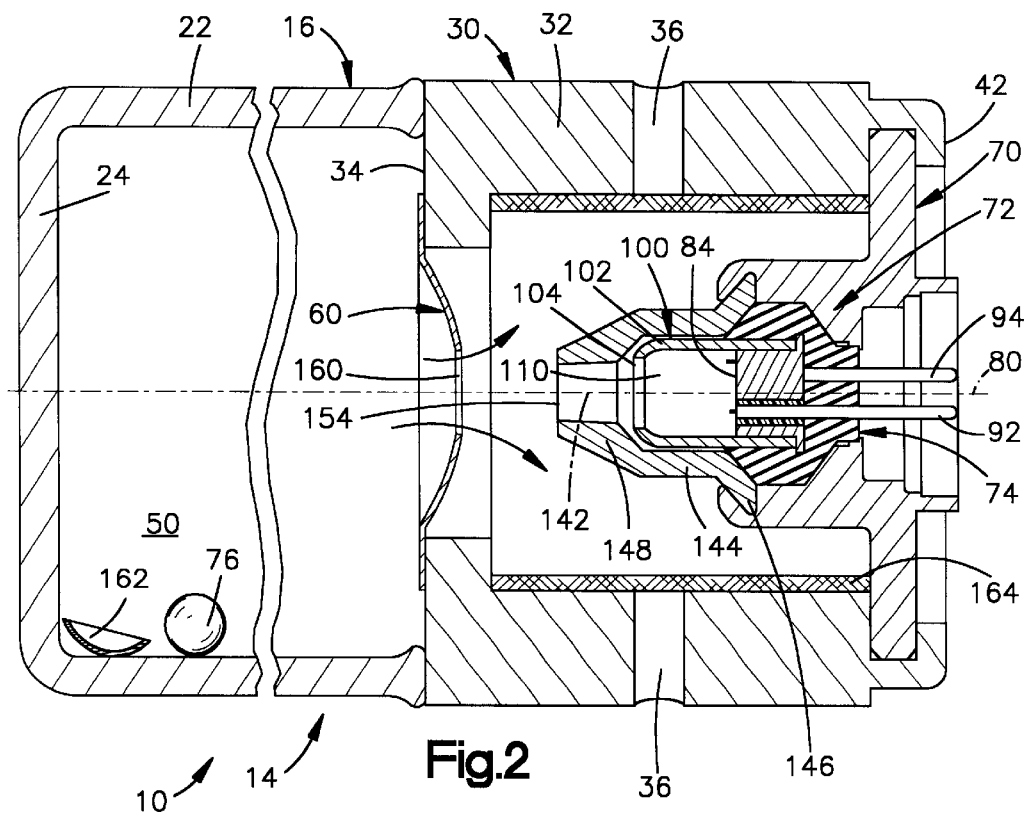
FIG. 2 is a view similar to FIG. 1 showing the inflator in an actuated condition.

The present invention relates to an apparatus for inflating an inflatable vehicle occupant protection device, such as an air bag. In particular, the present invention relates to an inflator having a burst disk which is opened by an initiator. As representative of the present invention, FIGS. 1 and 2 illustrate an inflator 10 for inflating an inflatable vehicle occupant protection device, or air bag, illustrated schematically at 12. Other inflatable vehicle occupant protection devices that can be used in accordance with the invention include, for example, inflatable seat belts, inflatable knee bolsters, inflatable head liners or side curtains, and knee bolsters operated by inflatable air bags.

The inflator 10 includes an inflator structure or container 14. The container 14 has a cylindrical main body portion 16 which is centered on an axis 20 of the container. The main body portion 16 of the container 14 includes a cylindrical, axially extending side wall 22 and a radially extending end wall 24.

The container 14 includes a diffuser 30. The diffuser 30 has a cylindrical side wall 32 and a radially extending inner end wall 34 welded to the main body portion 16 of the container. The side wall 32 of the diffuser defines a circular array of gas outlets 36. The inner end wall 34 of the diffuser 30 defines an opening 38 into an initiator chamber 40 in the diffuser. The diffuser 30 also has an open outer end portion 42 opposite the inner wall 34.

The main body portion 16 of the container 14 and the diffuser end wall 34 define a gas storage chamber 50. A quantity of inflation fluid 52 in the form of gas is stored under pressure in the chamber 50.

The container 14 also includes a burst disk 60 which extends across the opening 38 in the end wall 34. The burst disk 60 has a flat, annular outer portion 62 welded to the end wall 34. A domed central portion 64 of the burst disk 60 projects into the opening 38 in the end wall 34, in a direction away from the chamber 50. The domed portion 64 of the burst disk 60 is centered on the axis 20 of the container 14. The burst disk 60 blocks flow of the inflation fluid 52 out of the chamber 50 through the opening 38. The inflator 10 could alternatively include structure different than the burst disk 60 for closing the chamber 50, such as a thin-walled portion of the diffuser 30.

The inflator 10 includes a metal retainer 70 clamped in the outer end portion 42 of the diffuser 30. The retainer 70 secures an initiator assembly 72 in position in the inflator 10. The initiator assembly 72 includes an initiator 74, a projectile 76, and a focusing sleeve 78.

The initiator 74 has a central axis 80 which is coincident with the axis 20 of the container 14. The initiator 74 includes a cylindrical metal header 82 having a planar, radially extending end surface 84 (FIG. 2). A resistive element 90 extends between and electrically interconnects a first electrical terminal 92 and the inner end surface 84 of the header 82. A second electrical terminal 94 is welded to the header 82. The resistive element 90 thus electrically interconnects the first and second electrical terminals 92 and 94. The resistive element 90 is operative to generate heat when an electric current is passed through the resistive element between the first and second electrical terminals 92 and 94 of the initiator 74.

The initiator 74 includes a metal can or cap 100 (FIG. 2). The cap 100 has a cup-shaped configuration including a cylindrical, axially extending side wall 102 and a radially extending end wall 104. The side wall 102 of the cap 100 is centered on the axis 80. The cap 100 is sealed by welding to the header 82.

The cap 100 and the header 82 together define a chamber 110 (FIG. 2) in the cap. A quantity of ignitable material 112

(FIG. 1) is disposed in the chamber 110 in the cap 100 of the initiator 74. The ignitable material 112 is preferably a known pyrotechnic material such as $BKNO_3$, in powder form, which ignites when exposed to the heat generated by the resistive element 90. A stress riser (not shown) is preferably formed in the end wall 104 of the cap 100 to enable controlled opening of the cap as described below upon ignition of the ignitable material 112.

The initiator 74 also includes a body of plastic material 130. The body of plastic material 130 is injection molded around the header 82, the cap side wall 102, and the electrical terminals 92 and 94. The body of plastic material 130 is clamped in the retainer 70, to secure the initiator 74 in position in the inflator 10.

The focusing sleeve 78 is a tubular metal member having a central axis 142. The central axis 142 of the focusing sleeve 78 is located on, or coincident with, the axis 80 of the initiator 74. The focusing sleeve 78 has a main body portion 144 which encircles the side wall 102 of the cap 100. The main body portion 144 of the focusing sleeve 78 has a cylindrical configuration centered on the axis 142. An outwardly flared clamping portion 146 of the focusing sleeve 78 is clamped to the body of plastic material 130 by the retainer 70.

A barrel portion or barrel 148 of the focusing sleeve 78 extends from the main body portion 142 in a direction toward the burst disk 60. The barrel 148 has a cylindrical inner side surface 150 centered on the axis 142. The surface 150 defines a cylindrical passage 152 in the barrel 148. The passage 152 terminates in an opening 154.

The projectile 76 (FIG. 1) is preferably a metal ball. The projectile 76 is received in the passage 152 in the barrel 148 of the focusing sleeve 78. The projectile 76 is disposed adjacent to, and may touch, the end wall 104 of the cap 100 of the initiator 74. The projectile 76 has a spherical configuration and is preferably held with an interference fit in the focusing sleeve 78. A rupturable metal foil 156 across the opening 154 helps to keep the projectile 76 in the barrel 148 of the focusing sleeve 78.

The first and second electrical terminals 90 and 92 of the initiator 74 are connected with vehicle electric circuitry (not shown) including a power source, which is preferably a vehicle battery and/or a capacitor, and a normally open switch. The switch is part of a sensor which senses a vehicle condition indicating the occurrence of a collision. The collision-indicating condition may comprise, for example, sudden vehicle deceleration that is caused by a collision. If the collision-indicating condition is at or above a predetermined threshold level, this indicates the occurrence of a crash having a level of severity for which it is desired to inflate the air bag 12 or other vehicle occupant protection device to help protect an occupant of the vehicle.

When the sensor senses a collision-indicating condition at or above the predetermined threshold level, the switch closes and the initiator 74 is energized electrically. An electric current flows between the first and second terminals 92 and 94 of the initiator 74, through the resistive element 90. The resistive element 90 generates heat which ignites the ignitable material 112. The ignition of the ignitable material 112 produces hot combustion products which increase the pressure inside the cap 100. The pressure increase inside the cap 100 causes the cap to rupture.

The combustion products of the ignitable material 112 act on the projectile 76. The force of the combustion products causes the projectile 76 to move along the passage 152 in the barrel 148 of the focusing sleeve 78, in a direction away from the header 82 and toward the burst disk 60. As long as the projectile 76 remains in the passage 152, the force of the combustion products of the initiator 74 continues to act on the projectile. The projectile 76 accelerates for the entire time period in which the projectile 76 is located in the passage 152. The length of the passage 152 is selected to propel the spherical projectile out of the focusing sleeve at a predetermined speed sufficient to rupture and pass completely through the burst disk 60.

The projectile 76 is propelled out of the passage 152 in the focusing sleeve 78, through the opening 154. The projectile 76 continues to move in the direction in which it was moving when it exited the focusing sleeve 78. Thus, the focusing sleeve 78 helps to direct the projectile 76 to move in the desired direction, that is, along the axis 142 toward the center of the burst disk 60.

The projectile 76 moves into engagement with the burst disk 60. When the projectile 76 engages the burst disk 60, it removes and carries away a central portion 162 (FIG. 2) of the burst disk. The resulting opening 160 in the burst disk 60 allows the inflation fluid 52 to flow out of the chamber 50. The inflation fluid 52 flows through the gas outlets 36 in the diffuser 30 to inflate the air bag 12.

The projectile 76 moves into, and remains in, the chamber 50 in the container 14. Alternatively, the force of the inflation fluid 52 flowing out of the chamber 50, through the opening 160 in the burst disk 60, may cause the projectile 76 to move back into the initiator chamber 40. A screen shown schematically at 164, in the initiator chamber 40, prevents the projectile 76 from passing into any of the gas outlets 36.

Figure 3:
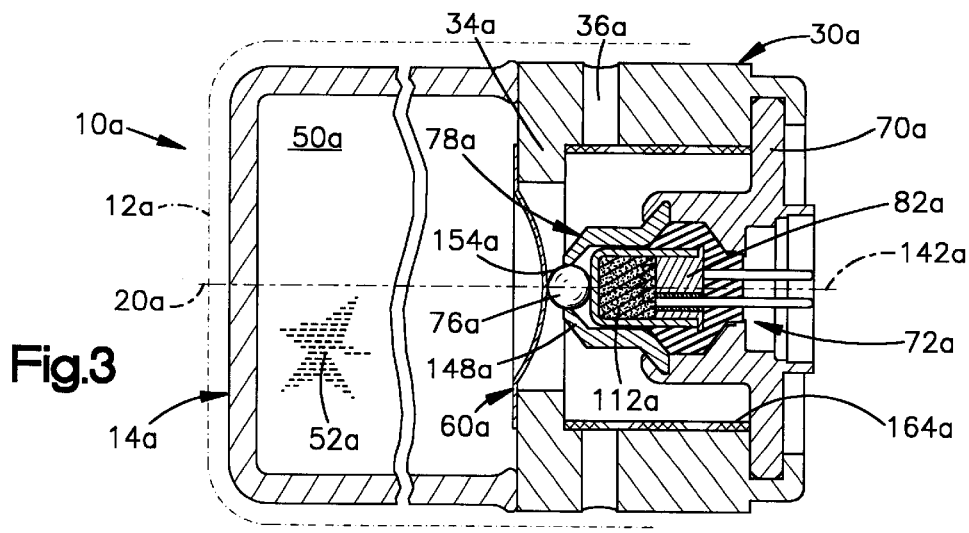
FIG. 3 is a view similar to FIG. 1 of an inflator constructed in accordance with a second embodiment of the present invention.
Figure 4:
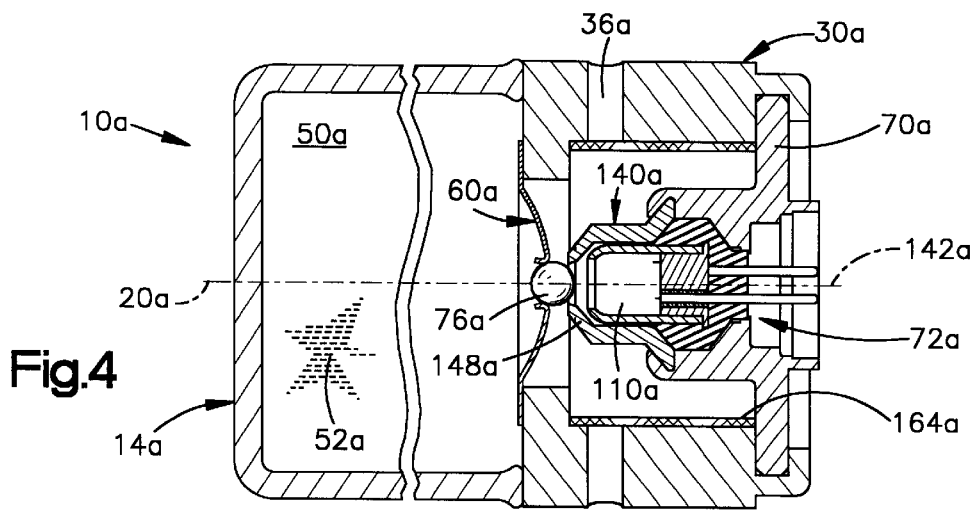
FIG. 4 is a view showing the inflator of FIG. 3 in a first actuated condition.
Figure 5:
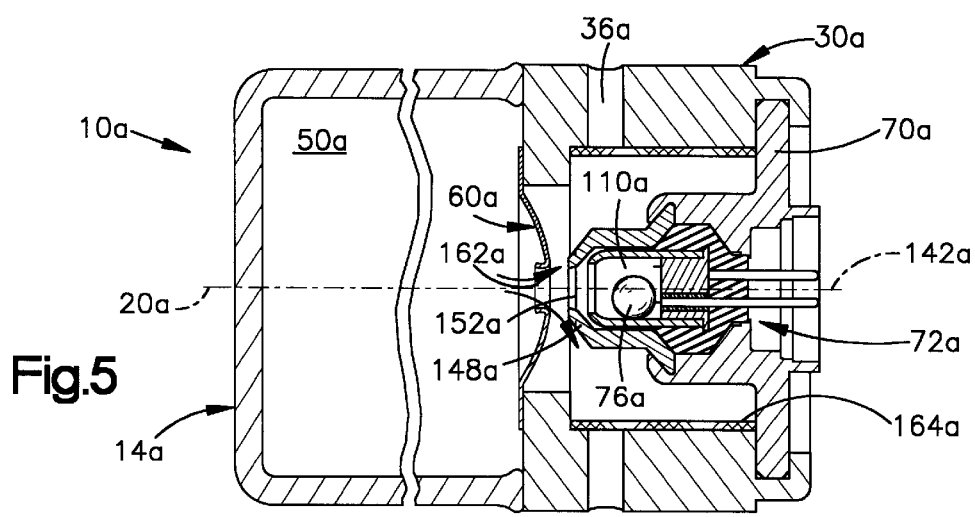
FIG. 5 is a view showing the inflator of FIG. 3 in a second actuated condition.

FIGS. 3–5 illustrate, on a reduced scale, portions of an inflator 10a constructed in accordance with a second embodiment of the present invention. The inflator 10a is generally similar in construction to the inflator 10, and similar parts are given similar reference numerals with the suffix "a" added to distinguish them.

The barrel 148a of the focusing sleeve 78a in the inflator 10a is substantially shorter than the barrel 148 of the focusing sleeve 78 in the inflator 10. Specifically, the barrel 148a of the focusing sleeve 78a is only as long as is necessary to retain the projectile 76a. A portion of the projectile 76a preferably extends outward from the end of the focusing sleeve 78a, through the opening 154a.

In addition, the burst disc 60a in the inflator 10a is very close to the initiator assembly 72a. Specifically, the container 14a is configured so that the inner end wall 34a of the diffuser 30a places the burst disc 60a in a position touching, or almost touching, the projectile 76a.

Upon actuation of the inflator 10a, the force generated by ignition and combustion of the ignitable material 112a causes the projectile 76a to move along the passage 152a (FIG. 5) in the barrel 148a of the focusing sleeve 78a, in a direction away from the header 82a and toward the burst disk 60a. The focusing sleeve 78a helps to direct the projectile 76a to move in the desired direction, that is, along the axis 142a toward the center of the burst disk 60a.

Because the barrel 148a is very short, the projectile 76a does not accelerate much before it engages the burst disk 60a. The projectile 76a therefore engages the burst disk 60a at a substantially slower speed than does the projectile 76 in the inflator 10 (FIGS. 1–2). Specifically, the length of the passage 152a is selected to propel the spherical projectile 76a out of the focusing sleeve 140a at a predetermined speed selected to enable movement of the projectile only partially through the burst disk 60a.

The projectile 76a (FIG. 4) ruptures the burst disk 60a and, under the force of the inflation fluid 52a flowing out of the chamber 50a, moves immediately back into the chamber 110a (FIG. 5) in the initiator 74a. The resulting opening 162a in the burst disk 60a allows the inflation fluid 52a to flow out of the chamber 50a, through the gas outlets 36a in the diffuser 30a to inflate the air bag 12a.

Figure 6:
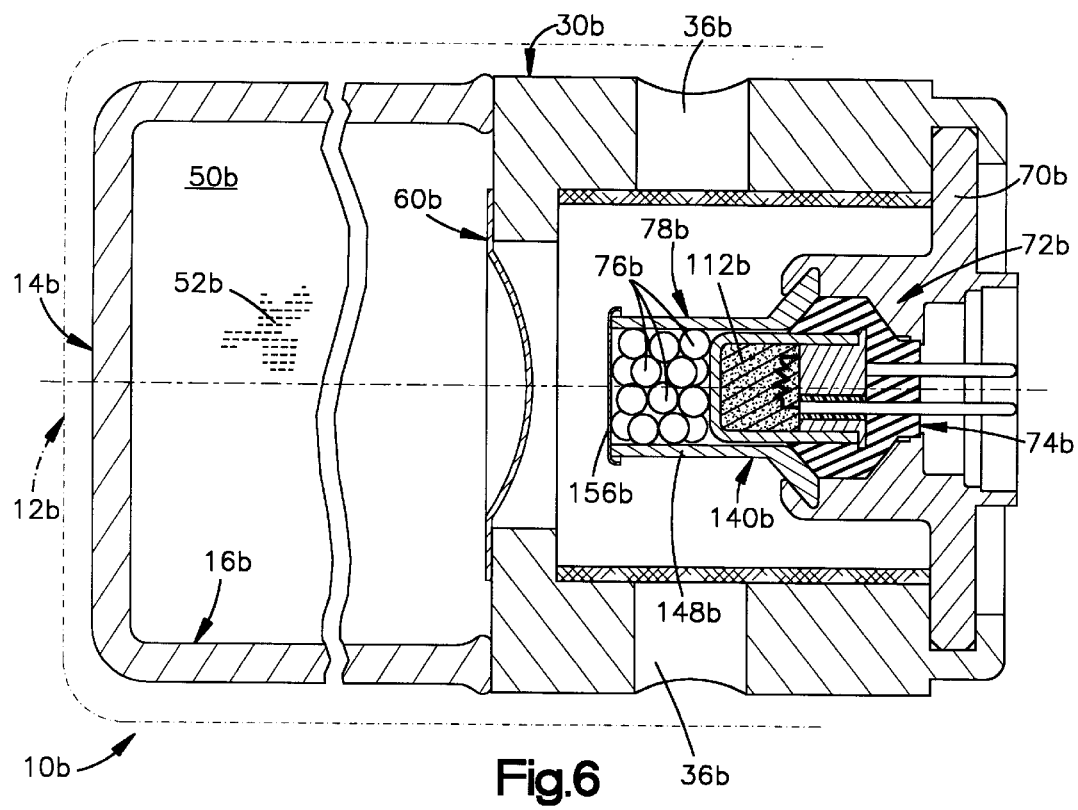
FIG. 6 is a view similar to FIG. 1 of an inflator constructed in accordance with a third embodiment of the present invention.
Figure 7:
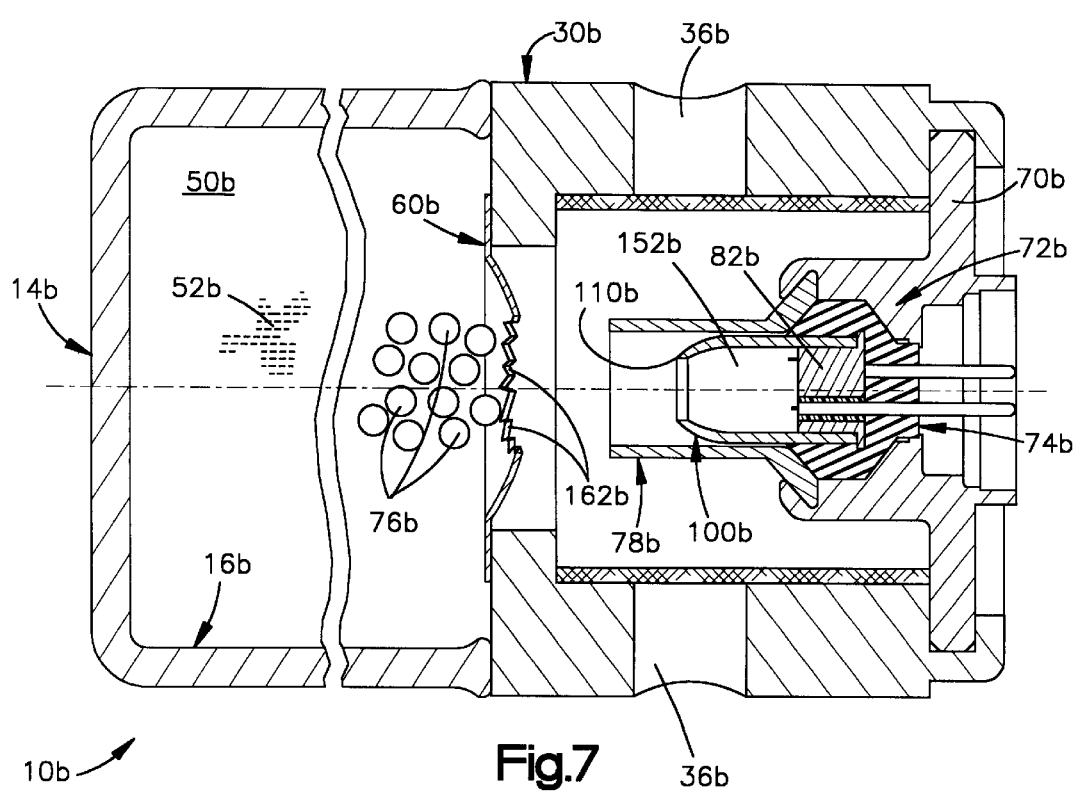
FIG. 7 is a view showing the inflator of FIG. 6 in an actuated condition.

FIGS. 6 and 7 illustrate portions of an inflator 10b constructed in accordance with a third embodiment of the present invention. The inflator 10b is generally similar in construction to the inflator 10 (FIGS. 1–2), and similar parts are given similar reference numerals with the suffix "b" added to distinguish them.

The initiator assembly 72b of the inflator 10b includes multiple projectiles 76b rather than the single projectile 76. Each one of the projectiles 76b has a spherical configuration. The projectiles 76b are contained within a focusing sleeve 78b. The focusing sleeve 78b has a cylindrical barrel 148b which extends around the cap 100b of the initiator 74b and which encloses the projectiles 76b. A metal foil 156b across the opening 154b helps to keep the projectiles 76b in the barrel of the focusing sleeve 78b.

Upon actuation of the inflator 10b, the force generated by ignition and combustion of the ignitable material 112b causes the projectiles 76b to move along the passage 152b (FIG. 7) in the barrel 148b of the focusing sleeve 78b, in a direction away from the header 82b and toward the burst disk 60b. The focusing sleeve 78b helps to direct the projectiles 76b to move in the desired direction, that is, generally along the axis 142b toward the center of the burst disk 60b.

The projectiles 76b engage and rupture the burst disk 60b at a plurality of different locations. The resulting openings 162b in the burst disk 60b allow the inflation fluid 52b to flow out of the chamber 50b. The inflation fluid 52b flows through the gas outlets 36b in the diffuser 30b to inflate the air bag 12b.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for inflating an inflatable vehicle occupant protection device, said apparatus comprising:

an inflator structure defining an inflator chamber for containing a quantity of inflation fluid under pressure, said inflator structure having a rupturable wall portion blocking fluid flow out of said inflator chamber;

an actuatable initiator connected with said inflator structure for, when actuated, generating combustion products, said initiator comprising:

a cap having a cylindrical side wall and a radially extending end wall, said side wall and said end wall being centered on an axis of said initiator;

a header connected to said side wall of said cap opposite said end wall, said cap and said header defining an initiator chamber of said initiator;

a body of pyrotechnic material disposed in said initiator chamber, said inflator being free from any other pyrotechnic material;

a resistive element disposed in said body of pyrotechnic material; and first and second electrically conductive terminals, said first and second terminals being connected to said header and being electrically connected to said resistive element;

a focusing sleeve having a cylindrical portion centered on said axis and positioned adjacent said end wall of said cap; and a spherical projectile supported in said focusing sleeve and touching said end wall of said cap;

said resistive element being operative to generate heat upon receiving an electrical current from said first and second terminals, said resistive element igniting said body of pyrotechnic material, said body of pyrotechnic material, when ignited, generating combustion products that act on said spherical projectile and cause spherical projectile to move through said focusing sleeve away from said initiator and into engagement with said wall portion to rupture said wall portion.

2. An apparatus as set forth in claim 1 wherein said spherical projectile comprises a metal ball.

3. An apparatus as set forth in claim 1 wherein said focusing sleeve has a cylindrical inner side surface extending parallel to and centered on said axis, said inner side surface defining a cylindrical passage in said focusing sleeve, said spherical projectile being located in said cylindrical passage.

4. An apparatus as set forth in claim 3 wherein said cylindrical passage has a predetermined length which is selected so that said spherical projectile is propelled out of said focusing sleeve at a predetermined speed.

5. An apparatus as set forth in claim 4 wherein the predetermined speed is selected to result in movement of said spherical projectile completely through said burst disk.

6. An apparatus as set forth in claim 4 wherein the predetermined speed is selected to result in movement of said spherical projectile only partially through said burst disk.

7. An apparatus as set forth in claim 1 wherein said focusing sleeve has a tubular configuration including a central portion extending around said initiator, a barrel portion extending axially from said central portion in a direction toward said burst disk, and a mounting portion extending axially from said central portion in a direction away from said burst disk.

8. An apparatus as set forth in claim 7 wherein said inflator structure comprises an end cap and a tubular initiator retainer secured in said end cap, said initiator retainer having an end portion engaging said mounting portion of said focusing sleeve to block movement of said focusing sleeve relative to said initiator.

9. An apparatus as set forth in claim 1 wherein said spherical projectile is one of a plurality of spherical projectiles retained adjacent to said initiator in said focusing sleeve.

10. An apparatus as set forth in claim 1 wherein the force of the combustion products of said initiator causes said projectile to move into said chamber after rupturing said burst disk.

11. An apparatus as set forth in claim 1 wherein the force of the combustion products of said initiator is not sufficient to cause said projectile to move into said chamber after rupturing said burst disk.

12. An apparatus as set forth in claim 1, wherein said spherical member touches said rupturable wall portion.

13. An apparatus as set forth in claim 12 wherein the force of the combustion products of said body of pyrotechnic material causes said projectile to move into said inflator chamber after rupturing said burst disk.

14. An apparatus as set forth in claim 12 wherein the force of the combustion products of said body of pyrotechnic material is not sufficient to cause said projectile to move into said inflator chamber after rupturing said burst disk.

15. An apparatus as set forth in claim 1 wherein said spherical projectile is one of a plurality of spherical projectiles, said plurality of spherical projectiles being retained in said focusing sleeve by metal foil that extends across an opening of said focusing sleeve, a portion of said plurality of spherical projectiles touching said end wall of said cap, another portion of said plurality of spherical projectiles touching said metal foil.

* * * * *